UNITED STATES PATENT OFFICE.

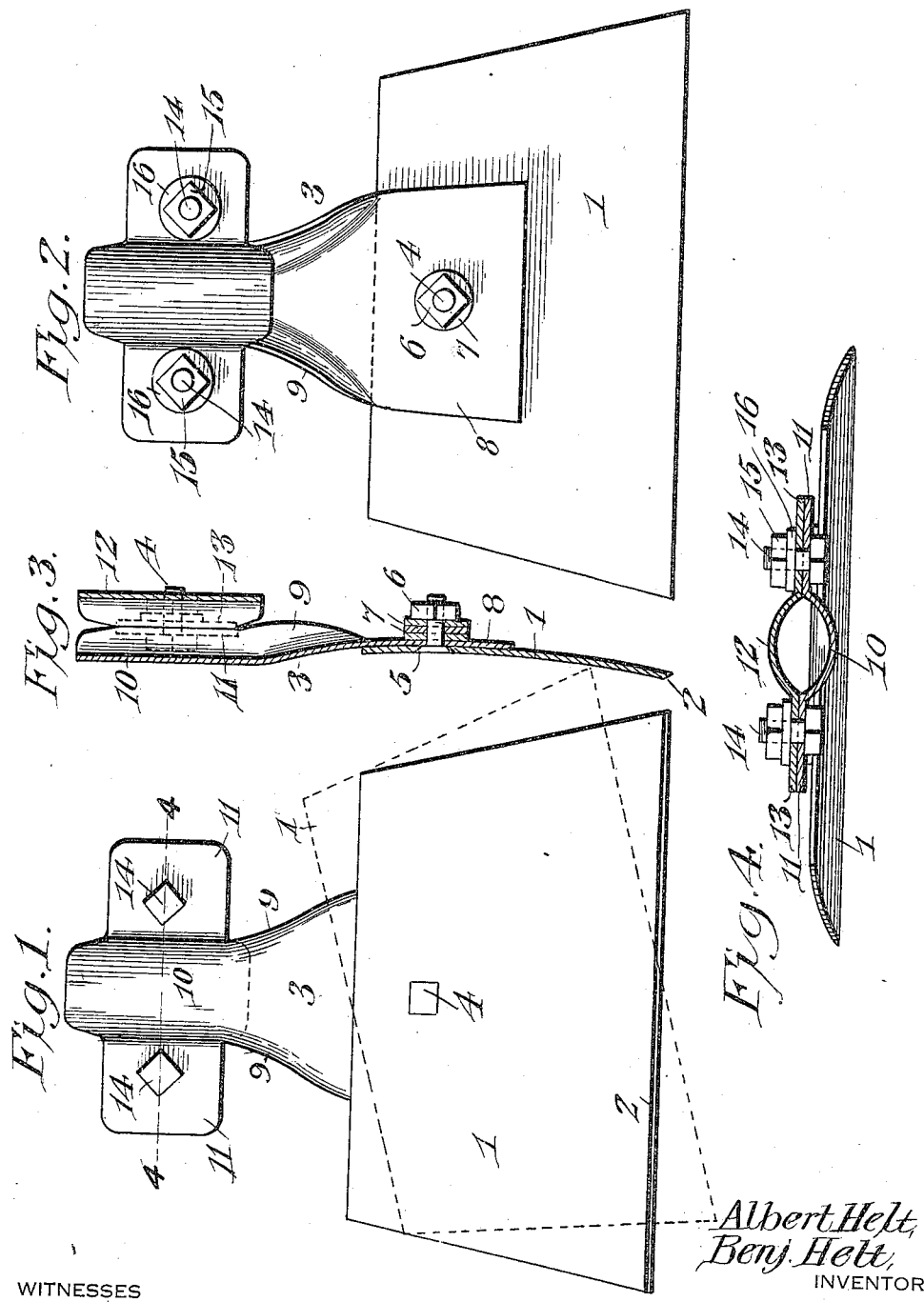

ALBERT HELT AND BENJAMIN HELT, OF PITTSFORD TOWNSHIP, BUTLER COUNTY, IOWA.

SHOVEL-BLADE.

994,158. Specification of Letters Patent. Patented June 6, 1911.

Application filed September 14, 1910. Serial No. 582,089.

*To all whom it may concern:*

Be it known that we, ALBERT HELT and BENJAMIN HELT, citizens of the United States, residing in Pittsford township, in the county of Butler and State of Iowa, have invented a new and useful Shovel-Blade, of which the following is a specification.

The invention relates to a shovel blade for corn plows and cultivators.

The object of the present invention is to improve the construction of shovel blades, and to provide a simple, inexpensive and efficient shovel blade, designed principally for use on corn plows, and capable of being arranged for throwing the soil either toward or from the corn, or for cutting weeds at a uniform depth between the rows, and capable also of being adjusted to run either deep or shallow.

Another object of the invention is to provide a shovel blade of this character, which will not cut the roots of the corn and which will be adapted to be applied to plows having standards of different sizes.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claim, may be resorted to without departing from the spirit or sacrificing any of the advantages of the invention.

In the drawing:—Figure 1 is a front elevation of a shovel blade, constructed in accordance with this invention, the blade being shown in a central position in full lines and tilted in dotted lines. Fig. 2 is a rear elevation of the shovel blade. Fig. 3 is a central vertical sectional view. Fig. 4 is a horizontal sectional view on the line 4—4 of Fig. 1.

Like numerals of reference designate corresponding parts in all the figures of the drawing.

1 designates a blade of substantially trapezoidal form, constructed of suitable metal and having parallel upper and lower edges and upwardly converging side edges. It is provided with a lower cutting edge 2 and it has a slight curvature from top to bottom and a uniform upward taper, and the straight side and bottom edges form points at each side or end of the blade. The blade is pivoted centrally of its upper portion to a shank 3 by a bolt 4, provided with a squared head tapered and secured within a counter-sunk opening 5 in the blade, as clearly illustrated in Fig. 3 of the drawing. The bolt, which has its head flush with the front or outer face of the blade, pierces the shank and is equipped with a nut 6, a plurality of washers 7 being preferably interposed between the nut and the shank. The blade is adapted to be arranged in a central position with its upper and lower edges horizontal, and it is adapted to be adjusted vertically by the means hereinafter described, so as to run at the desired depth, and it is capable when in such position of cutting the weeds at a uniform depth between the rows. The pivot bolt also permits the blade to be tilted, as illustrated in dotted lines in Fig. 1 of the drawing, and the lower corner or point may be arranged at either side or end of the blade for adjusting the same to throw the soil either toward or from the corn.

The shank 3, which is constructed of suitable sheet metal and which is stamped or otherwise formed, consists of a lower substantially flat portion 8, an intermediate transversely bowed upwardly tapered portion 9, and a transversely curved upper portion 10 having flat lateral extensions 11. The upper portion of the shank coöperates with a rear clamping plate 12, consisting of a central transversely curved portion and flat lateral extensions 13, arranged opposite the lateral extensions 11 of the shank and connected with the same by bolts 14. The transversely curved upper portion of the shank and the curved co-acting portion of the clamping plate are adapted to fit against the front and rear portions of the standard of a plow or cultivator, and they are adjusted by means of the said bolt to fit standards of different sizes, and also to permit the blade to be arranged at different elevations, so as to run at the required depth. The bolts 14 are equipped with nuts 15 and washers 16 are interposed between the nuts and the clamping plate.

Having thus fully described our invention, what we claim as new and desire to secure by Letters Patent, is:—

A device of the class described including a shank constructed of sheet metal and consisting of a substantially flat lower portion, an intermediate upwardly tapered transversely bowed portion, and a transversely curved top attaching portion having flat lateral extensions, a blade fitted against the lower flat portion of the shank and pivoted to the same so as to be adjusted to form a lower projecting point at either side of the blade, a rear clamping plate consisting of a curved intermediate portion to co-act with the upper attaching portion of the shank, and flat laterally projecting portions arranged opposite those of said shank, and fastening means adjustably connecting the laterally extending portions.

In testimony that we claim the foregoing as our own, we have hereto affixed our signatures in the presence of two witnesses.

ALBERT HELT.
BENJAMIN HELT.

Witnesses:
H. C. LIGGETT,
R. T. WARNER.

Copies of this patent may be obtained for five cents each, by addressing the "Commissioner of Patents, Washington, D. C."